US008650627B2

(12) United States Patent
Bidare

(10) Patent No.: US 8,650,627 B2
(45) Date of Patent: Feb. 11, 2014

(54) COMPUTER IMPLEMENTED SYSTEM AND METHOD FOR PROVIDING CHALLENGE-RESPONSE SOLUTIONS TO AUTHENTICATE A USER

(75) Inventor: Prasanna Bidare, Bangalore (IN)

(73) Assignee: Tata Consultancy Services Ltd. (IN)

( * ) Notice: Subject to any disclaimer, the term of this patent is extended or adjusted under 35 U.S.C. 154(b) by 26 days.

(21) Appl. No.: 13/409,986

(22) Filed: Mar. 1, 2012

(65) Prior Publication Data

US 2013/0174240 A1    Jul. 4, 2013

(30) Foreign Application Priority Data

Dec. 28, 2011  (IN) .......................... 3686/MUM/2011

(51) Int. Cl.
*G06F 21/36* (2013.01)

(52) U.S. Cl.
USPC ............................................................ 726/7

(58) Field of Classification Search
None
See application file for complete search history.

(56) References Cited

U.S. PATENT DOCUMENTS

| | | | | | |
|---|---|---|---|---|---|
| 5,898,779 | A | * | 4/1999 | Squilla et al. .................. | 713/176 |
| 6,148,406 | A | * | 11/2000 | Weisz et al. ...................... | 726/18 |
| 6,246,769 | B1 | * | 6/2001 | Kohut .............................. | 380/45 |
| 7,111,172 | B1 | * | 9/2006 | Duane et al. ................... | 713/182 |
| 7,409,705 | B2 | * | 8/2008 | Ueda et al. .......................... | 726/5 |
| 8,112,817 | B2 | * | 2/2012 | Chiruvolu et al. .............. | 726/30 |
| 8,191,126 | B2 | * | 5/2012 | Raghavan .......................... | 726/7 |
| 2004/0010721 | A1 | * | 1/2004 | Kirovski et al. .............. | 713/202 |
| 2004/0030934 | A1 | * | 2/2004 | Mizoguchi et al. ........... | 713/202 |
| 2004/0093527 | A1 | * | 5/2004 | Pering et al. .................. | 713/202 |
| 2004/0230843 | A1 | * | 11/2004 | Jansen ........................... | 713/202 |
| 2005/0010785 | A1 | | 1/2005 | Abe et al. | |
| 2007/0094717 | A1 | * | 4/2007 | Srinivasan et al. ................. | 726/5 |
| 2007/0226784 | A1 | * | 9/2007 | Ueda et al. .......................... | 726/5 |
| 2007/0277224 | A1 | | 11/2007 | Osborn et al. | |
| 2008/0168546 | A1 | | 7/2008 | Almeida | |
| 2008/0209223 | A1 | * | 8/2008 | Nandy et al. ................... | 713/185 |
| 2008/0244700 | A1 | * | 10/2008 | Osborn et al. ..................... | 726/2 |
| 2009/0199295 | A1 | * | 8/2009 | Shih et al. ........................ | 726/18 |
| 2009/0284344 | A1 | * | 11/2009 | Craymer et al. ............. | 340/5.54 |
| 2009/0300732 | A1 | * | 12/2009 | Hwang et al. ...................... | 726/5 |
| 2010/0043063 | A1 | * | 2/2010 | Ueda et al. .......................... | 726/6 |
| 2010/0107233 | A1 | * | 4/2010 | Dillon et al. ....................... | 726/7 |
| 2010/0281526 | A1 | * | 11/2010 | Raghavan .......................... | 726/7 |
| 2011/0162067 | A1 | * | 6/2011 | Shuart et al. ..................... | 726/19 |
| 2011/0191592 | A1 | * | 8/2011 | Goertzen ....................... | 713/182 |
| 2011/0202981 | A1 | * | 8/2011 | Tamai et al. ....................... | 726/6 |
| 2011/0314529 | A1 | * | 12/2011 | Bailey, Jr. ......................... | 726/7 |
| 2012/0005483 | A1 | | 1/2012 | Patvarczki et al. | |
| 2012/0011564 | A1 | * | 1/2012 | Osborn et al. ..................... | 726/2 |
| 2012/0291108 | A1 | * | 11/2012 | Talamo et al. ..................... | 726/6 |
| 2013/0138968 | A1 | * | 5/2013 | Yudkin et al. ................. | 713/183 |

* cited by examiner

*Primary Examiner* — Andrew Nalven
*Assistant Examiner* — Christopher Ruprecht
(74) *Attorney, Agent, or Firm* — Robert Plotkin, P.C.

(57) ABSTRACT

A system and method for providing challenge-response solutions to authenticate a user have been provided. The system includes web server comprising interlinking means adapted to interlink a plurality of images with unique index values such that each of the images has a unique index value. The web server includes registration means adapted to enable users to select at least two interlinked images for the purpose of registration. The web server includes challenge generation means adapted to generate, transmit an authentication challenge of the form of one-time equation. The web server, prior to transmitting the one-time equation, computes the value of the equation based on at least the sequence specified by the user. The web server compares the value calculated by the user with the value calculated prior to transmission and authenticates the user only in the event that said value calculated by the user is equivalent to the stored value.

15 Claims, 12 Drawing Sheets

Decoy Set 1

Decoy Set 2

Decoy Set 3

Decoy Set 4

| A1 | A2 | A3 | A4 | A5 |
|----|----|----|----|----|
| L1 | L2 | L3 | L4 | L5 |
| O1 | O2 | O3 | O4 | O5 |
| H1 | H2 | H3 | H4 | H5 |
| R1 | R2 | R3 | R4 | R5 |
| D1 | D2 | D3 | D4 | D5 |
| S1 | S2 | S3 | S4 | S5 |

FIGURE 12

| 11 | 98 | 34 | 52 | 31 |
|----|----|----|----|----|
| 01 | 99 | 22 | 72 | 82 |
| 55 | 32 | 35 | 57 | 29 |
| 42 | 24 | 09 | 02 | 88 |
| 45 | 74 | 27 | 23 | 12 |
| 87 | 97 | 92 | 07 | 05 |
| 00 | 22 | 33 | 44 | 50 |

FIGURE 14

COMPUTER IMPLEMENTED SYSTEM AND METHOD FOR PROVIDING CHALLENGE-RESPONSE SOLUTIONS TO AUTHENTICATE A USER

CROSS-REFERENCE TO RELATED APPLICATIONS

This application claims priority from Indian Patent Application Serial Number 3686/MUM/2011, filed on Dec. 28, 2011, entitled, "A Computer Implemented System and Method for Providing Challenge-Response Solutions to Authenticate a User."

FIELD OF DISCLOSURE

This disclosure relates to the field of authenticating users online by challenging them to prove their credentials. Particularly, this disclosure relates to a computer implemented authentication system and method for authenticating users based on the responses of the users to the challenge(s) provided to them online.

DEFINITIONS OF TERMS USED IN THE DISCLOSURE

The term 'image matrix' in this specification refers to the arrangement of the images selected by the user during registration, in the form of a matrix, typically a 4×4 matrix.

The term 'index-value matrix' in this specification refers to the arrangement of the index values corresponding to the images, in the form of a matrix, typically a 4×4 matrix.

The term 'clockwise Z sequence' in this disclosure refers to the pattern in which a user can traverse the elements of image matrices and index-value matrices. The term 'clockwise Z sequence' in this disclosure denotes that the user would traverse the contents of image matrices and index value matrices in clockwise direction and in the order which resembles the alphabet 'Z' (as shown in element III, FIG. 5 of accompanying drawings).

The term 'anticlockwise Z sequence' in this disclosure refers to the pattern in which a user can traverse the elements of image matrices and index-value matrices. The term 'anticlockwise Z sequence' in this disclosure denotes that the user would traverse the contents of image matrices and index value matrices in anti clockwise direction and in the order which resembles the alphabet 'Z' (as shown in element IV, FIG. 5 of accompanying drawings).

BACKGROUND

Transactions such as electronic funds transfer, online banking, e-procurement of goods and services and transactions providing access to sensitive data through privileged accounts are considered to be sensitive in nature. Such transactions are considered sensitive because they constitute utilization of sensitive data such as the account number, personal identification number (PIN) in case of electronic funds transfer and username and confidential password in case of electronic data access. Similarly, service providers who provide the implementation of aforementioned transaction and manage the transaction via at least their application servers are referred to as providers of sensitive services.

Banking and financial institutions (BFIs) are one of the examples of providers of sensitive services. BFIs provide clients with several financial services including money transfer, online banking, e-commerce and the like. Typically, the transactions performed by the clients with the applications servers associated with the BFIs involve exchange of sensitive client related information including but not restricted to client's bank account number, password and personal identification number. Therefore, it becomes necessary for service providers to confirm the identity of the users prior to enabling them access the relevant services.

In today's scenario, it is quite common for a particular user/client to use, for example, online banking to conduct banking transactions. The online banking facility provides the user with a quick and easy method of conducting monetary transactions without visiting the bank. However since these transactions are to be conducted through client's device, typically a personal computer or mobile phone, there is a need to ensure that such transactions remain secured and hacker resistant.

Some of the available authentication mechanisms include:
magnetic card readers which read the details corresponding to a card and subsequently authenticate the user based on the details associated with the card;
verifying Personal Identification Number (PIN)—a secret PIN is provided to the user which is required to be keyed in by the user every time a transaction is performed;
challenge questions & response—challenge questions which typically relate to personal information of a user are provided to the user. The user is authenticated and his/her identity is established based on the answers (responses) provided by the user; and
biometric authentication—the user is authenticated based on unique physical traits, including but not restricted to image of iris, fingerprints and image of retina.

The aforementioned authentication mechanisms succeed in determining whether the user has the necessary credentials and whether the user is indeed a human being or a computer machine impersonating a human user. But, the aforementioned mechanisms fail to identify whether the user is indeed the genuine user and the location of the user.

It is necessary for BFIs to collect non-refutable information and incorporate an authentication system which is secure, foolproof and difficult to manipulate. Thus there was a need for an authentication system, which is secure and foolproof and difficult to manipulate or in other words hack resistant. Also, the system needs to offer secured Authorization based on the clients Authentication credentials.

OBJECTS

Some of the non-limiting objects of the present disclosure, which at least one embodiment herein satisfy, are as follows:

An object of the present disclosure is to provide a combination of authentication mechanisms to duly authenticate a user.

Yet another object of the present disclosure is to provide a system that allows for images/pictures to be used as pass codes for authenticating a user.

Still a further object of the present disclosure is to provide a system that enables users to create their own customized picture identifiers for the purpose of authentication.

One more object of the present disclosure is to provide a system that makes use of a combination of picture identifiers and session based one-time equations for authenticating a user.

Another object of the present disclosure is to provide a system that facilitates authenticating the clients using personal computers as well as mobile phones.

Yet another object of the present disclosure is to provide a system that prevents spoofing/cloning and 'man in the middle' attacks.

Still a further object of the present disclosure is to provide a system that makes available multiple authentication options for users.

One more object of the present disclosure is to provide a system that is secured and hack resistant.

SUMMARY

The present disclosure envisages a computer implemented system for providing challenge-response solutions to authenticate a user. The system, in accordance with the present disclosure includes a web server.

the web server, in accordance with the present disclosure includes:
  interlinking means adapted to interlink a plurality of images with unique index values such that each of the images has a corresponding unique index value;
  registration means adapted to enable the user to select at least two interlinked images for the purpose of registration, the registration means further including:
    generation means adapted to generate at least two image matrices having interlinked images, wherein each of the image matrices include at least one interlinked image selected by the user, the generation means further adapted to arrange the unique index values corresponding to the interlinked images in the form of matrices and generate index-value matrices, the generation means still further adapted to transmit the image matrices and index-value matrices; and
    communication means adapted to enable the user to specify the sequence in which the image matrices and the index-value matrices are to be traversed, the sequence selected from the group of sequences consisting of clockwise sequence, anticlockwise sequence, clockwise Z sequence, anti clockwise Z sequence;
  challenge generation means adapted to generate and transmit an authentication challenge of the form of one-time equation, the challenge generation means further including:
    computing means adapted to compute the value of the one-time equation based on the sequence specified by the user, the interlinked images selected by the user during registration and the corresponding unique index-values; and
    storage means adapted to store the value of the one-time equation; the challenge generation means further adapted to prompt the user to calculate value of the one-time equation by using the image matrices, the index-value matrices and the sequence;
  comparator means adapted to compare the value stored in the storage means with the value calculated by the user; and
  authentication means adapted to authenticate the user only in the event that the value calculated by the user is equivalent to the value stored in the storage means.

Typically, in accordance with the present disclosure, the web server cooperates with a client device, the client device comprising:
  display means adapted to receive and display at least one of one time equation, the image matrices and the index value matrices, at least temporarily; and
  transmission means adapted to transmit to the web server, at least the value calculated by the user.

Typically, in accordance with the present disclosure, the web server includes a repository adapted to store at least one of profile information corresponding to the users, a set of alphanumeric characters, a set of images derived out of dot matrix combinations, a plurality of numbers and questions to which the numbers serve as answers, the plurality of images and the unique index values corresponding to the images.

Typically, in accordance with the present disclosure, the registration means is further adapted to optionally enable the user to select for the purpose of registration at least one of a plurality of alphanumeric characters from the set of alphanumeric characters and a plurality of images from the set of images derived out of dot matrix combinations, the set of alphanumeric characters and the set of images arranged in the form of respective 5×7 matrices, the registration means further including tracking means adapted to track the order in which at least one of the plurality of alphanumeric characters and the plurality of images are selected by the user, the registration means still further adapted to store the order in which the user selects at least one of the plurality of alphanumeric characters and the plurality of images.

Typically, in accordance with the present disclosure, the challenge generation means is further adapted to:
  generate and transmit an authentication challenge of the form of a secondary matrix only in the event that the user selects at least one of the set of alphanumeric characters and the set of images derived out of dot matrix combinations for the purpose of registration, wherein the secondary matrix includes entries selected form the group of entries consisting of numerals, alphabets and the set of images derived out of dot matrix combinations; and
  instruct the user to select the entries of the secondary matrix in the same order as that in which at least one of the plurality of alphanumeric characters and the plurality of images were selected from the 5×7 matrix during the registration.

Typically, in accordance with the present disclosure, the comparator means is adapted to compare the order in which the user selects the entries from the secondary matrix, with the order in which at least one of the plurality of alphanumeric characters and the plurality of images were selected from the 5×7 matrix during the registration.

Typically, in accordance with the present disclosure, the authentication means is further adapted to authenticate the user only in the event that the order in which the user selects the entries from the secondary matrix is same as the order in which at least one of the plurality of alphanumeric characters and the plurality of images were selected from the 5×7 matrix during the registration.

Typically, in accordance with the present disclosure, the registration means is adapted to optionally present the user with a plurality of questions/prompts, the registration means further adapted to enable the user to input a plurality of personal details in the form of numbers as answers for the questions/prompts, the registration means further adapted to store the numbers along with the corresponding questions/prompts.

Typically, in accordance with the present disclosure, the challenge generation means is further adapted to:
  optionally select at least one number and the corresponding question/prompt from the repository;
  instruct the computing means to calculate the value of the one-time equation based on the number;

instruct the storage means to store the value; and prompt the user to calculate value of the one-time equation by using the number which serves as the answer for the question/prompt.

The present disclosure envisages a computer implemented method for providing challenge-response solutions to authenticate a user. The method, in accordance with the present disclosure includes the following steps:

interlinking a plurality of images with unique index values such that each of the images has a corresponding unique index value;

enabling the user to select at least two interlinked images for the purpose of registration;

generating at least two image matrices having interlinked images, wherein each of the image matrices include at least one interlinked image selected by the user and arranging the unique index values corresponding to the interlinked images in the form of matrices and generating index-value matrices;

enabling the user to specify the sequence in which the image matrices and the index-value matrices are to be traversed;

generating and transmitting an authentication challenge of the form of one-time equation, computing at a web server the value of the one-time equation based on at least the interlinked images selected by the user during the registration, the corresponding index values and the sequence specified by the user, and storing the computed value at the web server;

displaying the one time equation, the image matrices and the index value matrices, at least temporarily, on a client device;

prompting the user to calculate the value of the one-time equation by using the image matrices, the index-value matrices and the sequence;

transmitting to the web server the value calculated by the user; and comparing the value stored at the web server with value calculated by the user and authenticating the user only in the event that the value calculated by the user is equivalent to the value stored in the web server.

Typically, in accordance with the present disclosure, the method further includes the following steps:

optionally arranging a set of alphanumeric characters and a set of images derived out of dot matrix combinations in the form of 5×7 matrices respectively;

optionally enabling the user to select at least one of the set of alphanumeric characters and the set of images derived out of dot matrix combinations for the purpose of registration, prompting the user to select for the purpose of registration at least one of a plurality of alphanumeric characters from the set of alphanumeric characters and a plurality of images from the set of images derived out of dot matrix combinations;

tracking the order in which at least one of a plurality of alphanumeric characters from the set of alphanumeric characters and a plurality of images from the set of images derived out of dot matrix combinations are selected by the user during the registration;

storing the order in which the user selects at least one of a plurality of alphanumeric characters from the set of alphanumeric characters and a plurality of images from the set of images derived out of dot matrix combinations;

generating and transmitting an authentication challenge of the form of a secondary matrix having entries selected form the group of entries consisting of numerals, alphabets and the images derived out of dot matrix combinations;

instructing the user to select the entries of the secondary matrix in the same order as that in which at least one of the plurality of alpha numeric characters and the plurality of images were selected during the registration;

comparing the order in which the user selects the entries in the secondary matrix, with the order in at least one of the plurality of alpha numeric characters and the plurality of images were selected during the registration; and authenticating the user if the order in which the user selects the entries in the secondary matrix is same as the order in which at least one of the plurality of alpha numeric characters and the plurality of images were selected from the 5×7 matrix during the registration.

Typically, in accordance with the present disclosure, the method further includes the following steps:

optionally presenting the user with a plurality of questions/prompts;

enabling the user to input a plurality of personal details in the form of numbers as answers for the questions/prompts;

storing the numbers along with the corresponding questions/prompts;

generating a one-time equation and selecting at least one number and the corresponding question/prompt from the repository;

instructing the computing means to calculate the value of the one-time equation based on the number and further instructing the storage means to store the value;

presenting the one time equation and selected question/prompt to the user;

prompting the user to calculate value of the one-time equation by using the number which serves as the answer for the question/prompt; and comparing the value stored in the storage means with the value calculated by the user and authenticating the user in the event that stored value is equivalent to the value calculated by the user.

The present disclosure envisages a computer program for instructing a computer to perform the method of providing challenge-response solutions to authenticate a user, the computer program configured to:

interlink a plurality of images with unique index values such that each of the plurality of images has a corresponding unique index value;

enable a user to select at least two interlinked images for the purpose of registration;

generate at least two image matrices having interlinked images, wherein each of the image matrices include at least one interlinked image selected by the user, and arrange the unique index values corresponding to the interlinked images in the form of matrices and generating index-value matrices;

enable the user to specify the sequence in which the image matrices and the index-value matrices are to be traversed;

generate and transmit an authentication challenge of the form of one-time equation;

compute the value of the one-time equation based on at least the interlinked images selected by the user during the registration, the corresponding index values and the sequence specified by the user, and store the computed value at the web server;

display the one time equation, the image matrices and the index value matrices, at least temporarily, on a client device;

prompt the user to calculate the value of the one-time equation by using the image matrices, the index-value matrices and the sequence;

transmit to the web server the value calculated by the user; and compare the value stored at the web server with value calculated by the user and authenticate the user only in the event that the value calculated by the user is equivalent to the value stored in the web server.

Typically, in accordance with the present disclosure, the computer program is further configured to:

optionally arrange a set of alphanumeric characters and a set of images derived out of dot matrix combinations in the form of 5×7 matrices respectively;

optionally enable the user to select at least one of the set of alphanumeric characters and the set of images derived out of dot matrix combinations for the purpose of registration;

prompt the user to select for the purpose of registration, at least one of a plurality of alphanumeric characters from the set of alphanumeric characters and a plurality of images from the set of images derived out of dot matrix combinations;

track the order in which at least one of a plurality of alphanumeric characters from the set of alphanumeric characters and a plurality of images from the set of images derived out of dot matrix combinations are selected by the user during the registration;

store the order in which the user selects at least one of a plurality of alphanumeric characters from the set of alphanumeric characters and a plurality of images from the set of images derived out of dot matrix combinations;

generate and transmit an authentication challenge of the form of a secondary matrix having entries selected form the group of entries consisting of numerals, alphabets and the images derived out of dot matrix combinations;

instruct the user to select the entries of the secondary matrix in the same order as that in which at least one of the plurality of alpha numeric characters and the plurality of images were selected during the registration;

compare the order in which the user selects the entries in the secondary matrix, with the order in at least one of the plurality of alpha numeric characters and the plurality of images were selected during the registration; and authenticate the user if the order in which the user selects the entries in the secondary matrix is same as the order in which at least one of the plurality of alpha numeric characters and the plurality of images were selected from the 5×7 matrix during the registration.

Typically, in accordance with the present disclosure, the computer program is further configured to:

optionally present the user with a plurality of questions/prompts;

enable the user to input a plurality of personal details in the form of numbers as answers for the questions/prompts;

store the numbers along with the corresponding questions/prompts;

generate a one-time equation and select at least one number and the corresponding question/prompt from the repository;

instruct the computing means to calculate the value of the one-time equation based on the number and further instruct the storage means to store the value;

present the one time equation and selected question/prompt to the user;

prompt the user to calculate value of the one-time equation by using the number which serves as the answer for the question/prompt; and compare the value stored in the storage means with the value calculated by the user and authenticate the user in the event that stored value is equivalent to the value calculated by the user.

BRIEF DESCRIPTION OF THE ACCOMPANYING DRAWINGS

The present invention will now be described with reference to the non-limiting, accompanying drawings, in which:

FIGS. 6, 8 and 10 illustrate the index-value matrices provided to the user for solving the one-time equation, in accordance with the present disclosure;

FIGS. 7, 9 and 11 illustrate the image matrices provided to the user for solving the one-time equation, in accordance with the present disclosure;

FIGS. 12 and 13 illustrate generating customized theme pictures based on user's preferences, in accordance with the present disclosure; and FIG. 14 illustrates the secondary matrix provided to the user for the purpose of authentication, in accordance with the present disclosure.

DETAILED DESCRIPTION OF THE ACCOMPANYING DRAWINGS

The present disclosure will now be described with reference to the accompanying drawings which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the embodiments as described herein.

Figure 1:
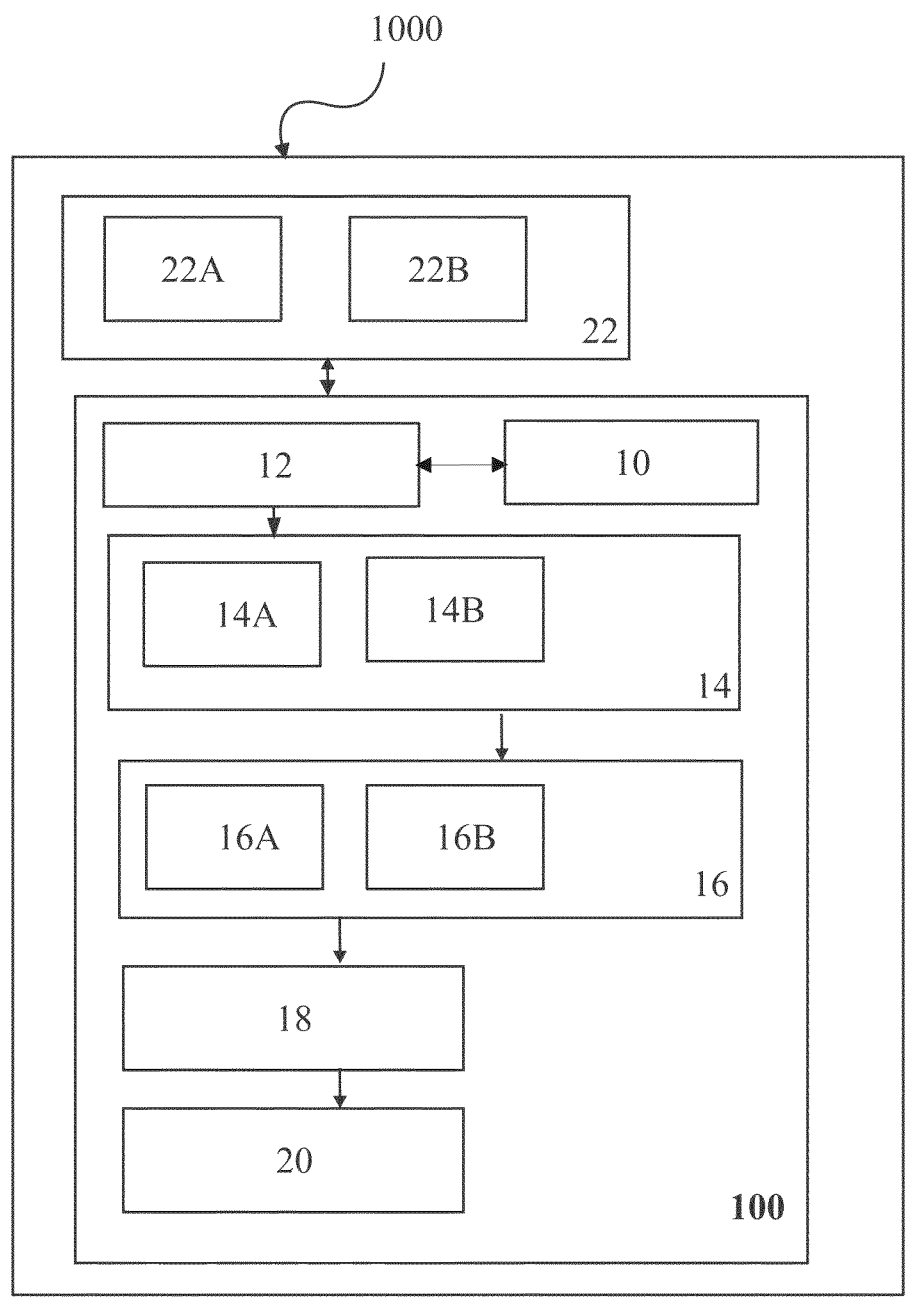
FIG. 1 illustrates a schematic representation of a computer implemented system for providing challenge-response solutions for authenticating a user, in accordance with the present disclosure.

The present disclosure discloses a computer implemented system and method for authenticating users. The system envisaged by the present disclosure makes use of a combination of images and a one-time equation for authenticating the users. Referring to FIG. 1, there is shown a system 1000 for providing challenge-response solutions to authenticate a user. The system 1000, in accordance with the present disclosure includes a web server denoted by the reference numeral 100. The web server 100 is responsible for providing the challenge-response solutions to users for the purpose of authenticating them. The web server 100 makes use of a combination of images associated with unique index values and one time equations to authenticate the users. The web server 100 includes a repository 12 adapted to store at least one of a plurality of images, unique-index values corresponding to each of the images and the profile information including name, email-id and the like corresponding to the users. The web server 100 includes interlinking means denoted by the reference numeral 10 adapted to interlink a plurality of images with corresponding unique index values. The interlinking means 10 cooperates with a repository denoted by reference numeral 12 which is adapted to store at least one of a plurality of images and a plurality of unique index values. The interlinking means 10 interlinks each of the images with a unique index value and creates and creates interlinked images. The interlinked images created by the interlinking means 10 are also stored on the repository 12.

The web server 100 further includes a registration means denoted by reference numeral 14 which is adapted to enable the user to select at least two interlinked images for the purpose of registering himself/herself with the web server 100 for the purpose of authentication. The registration means 14 is further adapted to present typically, ten interlinked pictures to the user for the purpose of registration. During the process of registration, the user can select the interlinked images of his/her choice. The interlinked pictures provided to the user, for the purpose of registration are typically in the form including but not restricted to theme pictures, kaleidoscopic pictures in a geometric form and kaleidoscopic pictures in non-geometric form, pictures of the user himself/ herself with different postures.

For the purpose of registration, the user needs to select at least two interlinked pictures from the set of interlinked pictures presented for registration. Further, the process of registration may also involve training the user for using the system 1000 by running a random set/series of pictures for the purpose of demonstration and asking the user to once again select the interlinked images that he/she had previously selected, during the process of registration so that the user would get used to identifying from a set/series of interlinked pictures, the interlinked pictures selected by him/her during the process of registration.

Figure 3:
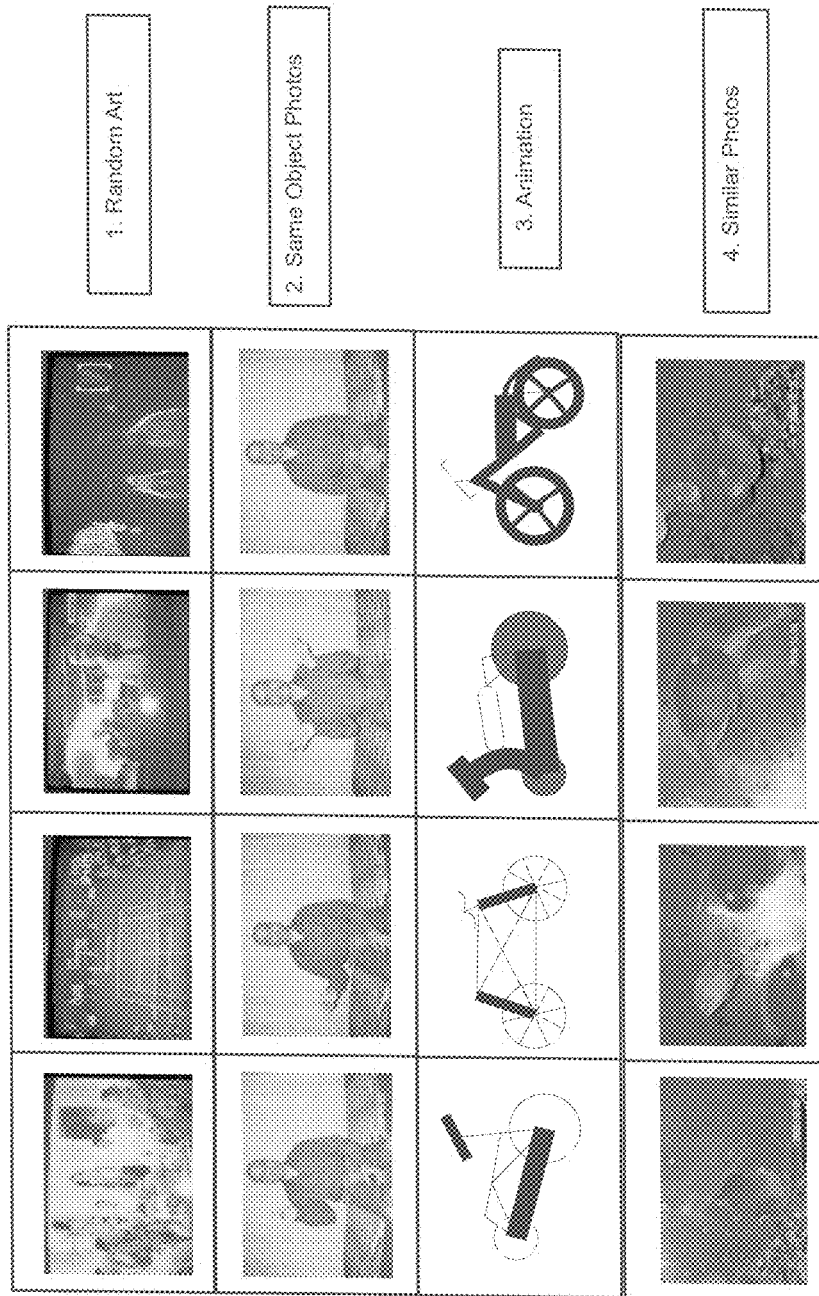
FIGS. 3 to 5 illustrate the registration process undertaken by the system of the present disclosure.
Figure 4:
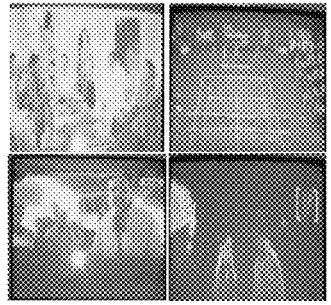
Figure 4:
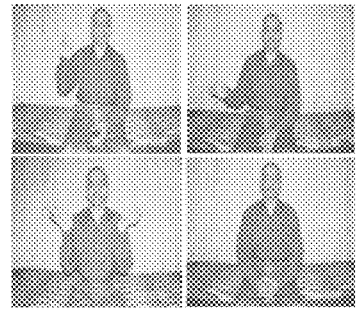
Figure 4:
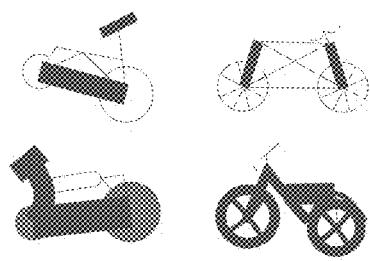
Figure 4:
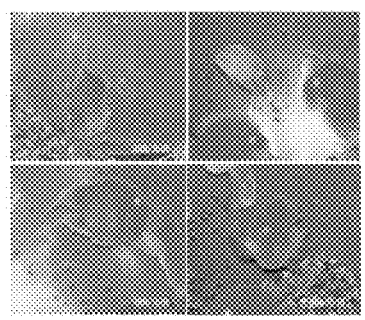

The registration means 14 includes generation means denoted by the reference numeral 14A. The generation means 14A is adapted to generate at least two image matrices containing interlinked images. The term 'image matrix' in this specification refers to the arrangement of the images selected by the user during registration, in the form of a matrix, typically a 4×4 matrix. Each of the image matrices created by the generation means 14A contain at least one interlinked image selected by the user during the process of registration. FIG. 3 and FIG. 4 exemplify few of the image matrices generated by the generation means 14A. Each of the image matrices contain at least one image selected by the user during the process of registration. Apart from the image selected by the user during registration, the image matrices also contain decoy images (as shown in FIG. 4). Typically, the image matrices containing interlinked images are of the size 4×4 and contain '4' images. Each of the image matrices typically contain one interlinked image selected by the user and the rest of the images, i.e. '3' images, act as decoy images (as shown in FIG. 4). In accordance with this disclosure even the images serving as decoy images are also interlinked to unique index values. In accordance with this disclosure the user can user a plurality of interlinked images to create his/her own picture ID. The generation means 14 is further adapted to arrange the unique index values corresponding to the interlinked matrices in the form of matrices, typically of the size 4×4 and generate index-value matrices. The term 'index-value matrix' in this specification refers to the arrangement of the index values corresponding to the images, in the form of a matrix, typically a 4×4 matrix. For the purpose of authenticating a user, the image matrices as well as the corresponding index value matrices will be presented to the user on the client device (not shown in figures) associated with the user.

Figure 5:
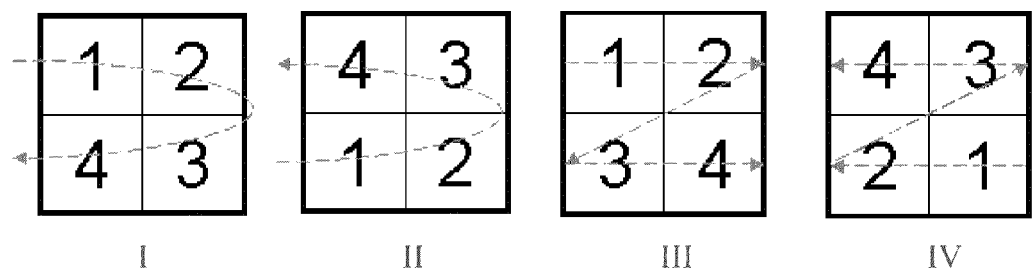

The web server 100, in accordance with the present disclosure, further includes communication means denoted by the reference numeral 14B adapted to enable the user to specify the sequence in which the image matrices and the index value matrices are to be traversed (read). The sequence of traversing (reading) is selected from the group of sequences consisting of clockwise sequence, anticlockwise sequence, clockwise Z sequence and anticlockwise Z sequence (as shown in FIG. 5). The sequence of traversal specified by the user corresponding to the image matrices will also be applied to the corresponding index value matrices and the index-value matrices will also be traversed in the same sequence in which the image matrices were traversed. Firstly, the user is required to traverse the image matrices in the specified sequences and identify, on the respective image matrices the location of the interlinked images selected by him/her during the process of registration. Subsequently, based on the location on the image matrices of the interlinked images selected by him/her during the process of registration, the user is required to identify the values of the variables contained in the one-time equation one-time equation by referring to the corresponding index-value matrices.

Subsequent to the user specifying the sequence in which the image matrices are to be traversed, the challenge generation means 16 of the web server 100 generates a unique One-Time Equation (OTE) and offers it to the user as a challenge. For the purpose of authentication, the user is required to compute the value of the one-time equation provided to him/her by the challenge generation means 16. The challenge-generation means 16 generates One-Time Equations which are simple and the value of which can be computed by hand. The one-time equations provided by the challenge-generation means 16 will typically be in the form $Ax+By+Cz+M$. However, it is possible that the one-time equations generated by the challenge-generation means 16 may have a format other than the one provided above. In order to establish his/her identity, the client is required to solve (compute the final value) the one-time equation and communicate the final value corresponding to the one-time equation to the web server 100.

In accordance with one exemplary embodiment of the present disclosure, if the user has selected three interlinked images during the phase of registration, a one-time equation containing at least two variables (X and Y) and one constant (M) will be provided to the user. Accordingly, three image matrices and three corresponding index-value matrices will be displayed to the user for the purpose of authentication. The three image matrices and index-value matrices enable the user to determine the values of the variables X, Y and the constant M. Typically, the value of the constant M can be determined by the user based solely on visual inspection of the corresponding image matrix and index-value matrix, and without specifying any particular sequence of traversal. In accordance with the present disclosure, the image matrices will be typically provided to the user on his/her mobile phone. The index-value matrices corresponding to the image matrices will be displayed to the user on the personal computer associated with the user. If there are 'three' image matrices, then 'three' index-value matrices will be provided to the user on his/her personal computer. In order to authenticate himself/herself, the user is prompted by the challenge generation means 16 to make use of the image matrices, index-value matrices and the sequence of traversal specified earlier by the user himself/herself, and calculate the value of the one-time equation.

The challenge generation means 16, in accordance with the present disclosure further includes computing means 16A which is adapted to compute the value of the one-time equation generated by the challenge-generation means 16. Typically, the value of the one-time equation is computed by the computing means 16A and subsequently stored in storage means 16B (before the one-time equation is transmitted to the user. The value of the one-time equation which to be transmitted to the user is calculated before the transmission of the same for the purpose of comparing the value computed by the computing means 16A with the value of the one-time equation calculated by the user.

In accordance with the present disclosure, the web server 100 further includes comparator means denoted by the reference numeral 18. The comparator means 18 cooperates with the storage means 16B to receive the computed value of the one-time equation that has been transmitted to the user. The comparator means 18 is adapted to compare the value received from the storage means 16B with value of calculated by the user. The web server 100 further includes authentication means denoted by the reference numeral 20 and adapted to authenticate the user only in the event that the value (value of the one-time equation) calculated by the user is equivalent to the value (value of the one-time equation) stored in the storage means 16B.

In accordance with the present disclosure, the system 1000 further includes client device denoted by the reference numeral 22 and cooperating with the web server 100. The client device 22 is associated with the user and is selected from the group of devices consisting of personal computer and GPRS enabled mobile phone. Typically, in accordance with the present disclosure, the one-time equation and the image matrices are provided to the user through the GPRS enabled mobile phone associated with the user and the index-value matrices are provided to the user through the personal computer associated with the user. However it is possible that either a personal computer or a mobile phone is used to facilitate communication between the user and the web server 100. The client device 22 includes display means denoted by reference numeral 22A which is adapted to display at least the one time equation generated by the challenge generation means 16, image matrices and index value matrices generated by the generation means 14A, at least temporarily. The client device 22 further includes transmission means denoted by the reference numeral 22B adapted to transmit to the web server 100, at least the value (value of the one-time equation) calculated by the user.

In accordance with an exemplary embodiment of the present disclosure, the system 1000 executes an authentication process involving the below mentioned steps. Typically, users equipped with a GPRS enabled mobile phone as well as a mobile phone are allowed to make use of the system 1000 for authenticating themselves. However it is possible to extend the services of the system 1000 to users associated with either a mobile phone or a personal computer without departing from the scope of the present disclosure. Using his/her personal computer or GPRS enabled mobile phone, the client logs onto to the website (typically, a website that hosts sensitive information and/or permits sensitive transactions to be performed). Now the user needs to be authenticated before he/she could continue accessing the website. The user, prior to accessing the website, is required to register himself/herself with the registration means 14 which requires the user to select at least two interlinked images for the purpose of registration.

Using the interlinked images selected by the user, the generation means 14A generates at least two images matrices, wherein each image matrix contains at least one interlinked image selected by the user. The generation means takes into consideration the number of interlinked images selected by the user during the process of registration. That is, if the user has selected two interlinked images (during the phase of registration, 'two' image matrices will be provided to the user and the one-time equation provided to the user for authentication will also have two variables, for example X and M). For the sake of explanation, let us assume that the user has selected two interlinked images during the process of registration. Therefore, three image matrices, each having at least one interlinked image selected by the user would be provided to the user for the purpose of authentication.

The image matrices generated by the generation means 14A would be typically displayed on the GPRS enabled mobile phone associated with the user. Before the display of the image matrices, the user is prompted, through the communication means 16B to specify the sequence in which he/she intends to traverse the displayed image matrices. The sequence of traversal is selected from the group of sequences consisting of clockwise sequence, anticlockwise sequence, clockwise Z sequence and anticlockwise Z sequence. The user specifies to the web server 100 that he/she would traverse the displayed image matrices in, for example clock wise sequence and clock wise Z sequence respectively. Subsequently, the challenge generation means 16 generates a one-time equation for example; $2X^2+7Y^2+M$, having three variables namely X, Y and M, and transmits the one-time equation to the GPRS mobile phone associated with the user. The user, in order to authenticate him/her needs to compute the value associated with X, Y and M by making use of the corresponding image matrices and index-value matrices.

Figures 6, 7:
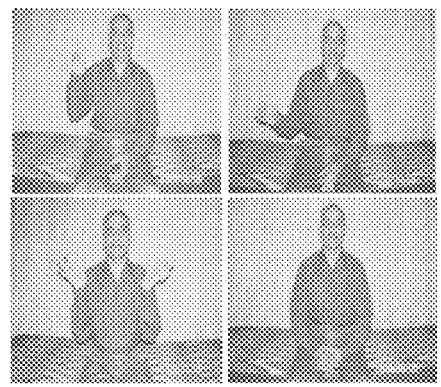

Subsequently, the first image matrix will be transmitted to the user through his/her GPRS enabled mobile phone. The first image matrix is exemplified in FIG. 7. Subsequently, the index-value matrix corresponding to the first image matrix and containing the index values corresponding to the interlinked images present in the first image matrix will be transmitted to the user on his/her personal computer. The first index-value matrix is exemplified in FIG. 6. The user is required to identify the value of 'X' by inspecting FIGS. 6 and 7 and traversing both of them in clock wise direction. Referring to FIG. 7, the interlinked image selected by the user during the process of registration is located on the 'second cell of the first row'. Referring to FIG. 6, the value present on the 'second cell of the first row' is '5'. Therefore, by inspecting FIGS. 6 and 7, the user determines the value of 'X' to be 5 and computes the value of 'X' component of the one-time equation, i.e. $2X^2=50$.

Figures 8, 9:
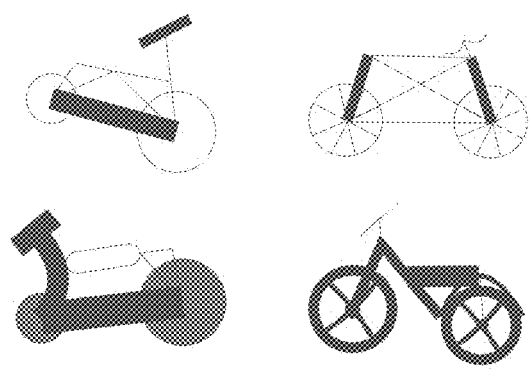

Subsequently, the second image matrix will be transmitted to the user through his/her GPRS enabled mobile phone. The second image matrix is exemplified in FIG. 9. Subsequently, the index-value matrix corresponding to the second image matrix and containing the index values corresponding to the interlinked images present in the second image matrix will be transmitted to the user on his/her personal computer. The second index-value matrix is exemplified in FIG. 8. The user is required to identify the value of 'Y' by inspecting FIGS. 8 and 9 and traversing both of them in clock wise Z direction. Referring to FIG. 9, the interlinked image selected by the user during the process of registration is located on the 'first cell of the second row'. Referring to FIG. 8, the value present on the 'first cell of the second row' is '3'. Therefore, by inspecting FIGS. 8 and 9, the user determines the value of 'Y' to be '3' and computes the value of 'Y' component of the one-time equation, i.e. $7Y^2=63$.

Figures 10, 11:
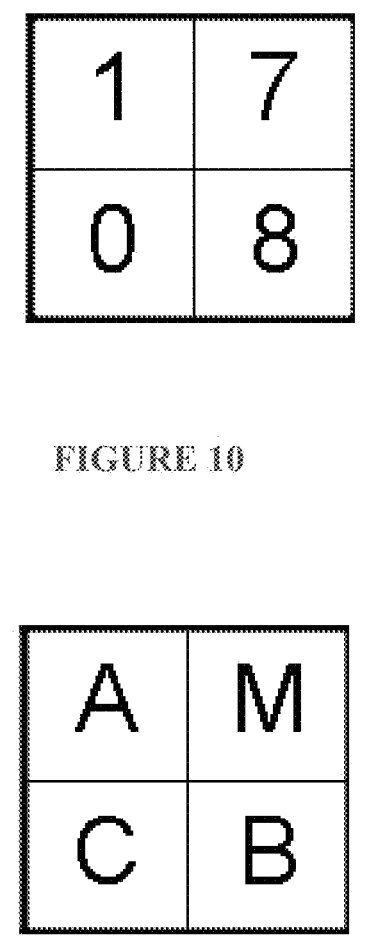

Subsequently, the third image matrix will be transmitted to the user through his/her GPRS enabled mobile phone. The third image matrix is exemplified in FIG. 11. Subsequently, the index-value matrix corresponding to the third image matrix and containing the index values corresponding to the interlinked images present in the third image matrix will be transmitted to the user on his/her personal computer. The second index-value matrix is exemplified in FIG. 10. The user is required to identify the value of 'M' by inspecting FIGS. 10 and 11. Referring to FIG. 11, the element M whose value is to be computed is located on the 'second cell of the first row'. Referring to FIG. 10, the value present on the 'second cell of the first row' is '7'. Therefore, by inspecting FIGS. 10 and 11, the user determines the value of 'M' to be 7 and computes the value of 'M' component of the one-time equation, i.e. M=7.

Subsequently, the user computes the value of the long-time equation to be '120' (wherein, $2X^2+7Y^2+M=50+63+7=120$) and communicates the value to the web server 100. The value of the one-time equation (value computed by the user) is compared with the value of the one-time equation computed by the computing means 16A before the transmission of the one-time equation, and stored in storage means 16B. The comparator means 18 compares the value calculated by the user with the value calculated by the computing means 16B. The authentication means 20 authenticates the user successfully only in the event that the value calculated by the user is equivalent to the value stored in the storage means 16B.

The system 1000 authenticates the user via using both the personal computer and the mobile phone associated with the user. Therefore, a hacker trying to hack the process of authentication undertaken by the system 1000 would not be able to simultaneously hack onto the user's mobile phone and personal computer. Further, the system 1000 prevents the occurrence of any spoofing/cloning attacks.

Figure 13:
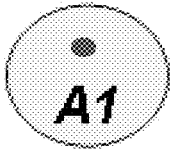

In accordance with another exemplary embodiment of the present disclosure, the system 1000 makes use of a custom theme picture created by the user himself/herself for the purpose of authentication. In accordance with this exemplary embodiment, the registration means 14, as a part of registering the user offers him/her a primary matrix, typically a 5×7 matrix filled with either a set of random alphanumeric characters (as exemplified in FIG. 12) or a set of images derived out of dot matrix combinations for the purpose of creating his/her customized theme picture. The registration means 14 cooperates with the repository to receive the set of alphanumeric characters and the set of images derived out of dot matrix combinations. The registration means 14 subsequently creates the primary matrix containing at least one of a set of random alphanumeric characters and a set of images derived out of dot matrix combinations. The user is prompted to select the cells of the primary matrix in a random fashion in order to create his/her own theme picture and complete the process of registration. The registration means 14 is adapted to trace the order in which the user selects the cells containing alphanumeric values/images derived out of dot matrix combinations for the purpose of registration. The registration means 14 further stores the order in which the user has selected the alphanumeric characters. As shown in FIG. 13, for the purpose of registration, the user selects the cells L3, O4, D3, R4, A1, H1, H2, S1, H5, H3 and H4 of the primary matrix. The pattern of selection, that is, 'L3, O4, D3, R4, A1, H1, H2, S1, H5, H3 and H4' is now considered as the theme picture of the user and for the purpose of authentication, the user is required to select the cells in the same order, i.e., L3, O4, D3, R4, A1, H1, H2, S1, H5, H3 and H4.

Subsequently, the challenge generation means 16 offers another 5×7 matrix (secondary matrix) filled with fresh entries, the entries selected from the group of entries consisting of numerals, alphabets and images derived out dot matrix combinations, to the user and the user is required to select the cells of the secondary matrix in the same order in which he/she had selected the entries of the primary matrix, i.e., in the order L3, O4, D3, R4, A1, H1, H2, S1, H5, H3 and H4. The user needs to memorize the order in which he/she had selected the cells of the primary matrix during the process of registration and subsequently select the same cells in the secondary matrix.

Referring to FIG. 13, the secondary matrix includes cells having numerals as entries. But it is within the scope of this disclosure to create the secondary matrix having alphabets or images derived out of dot matrix combinations as entries. The cells of the secondary matrix are selected in an order wherein L3 is the first element to be selected and H4 is the last element to be selected. Therefore, the user selects the cells of the secondary matrix in the order 'L3, O4, D3, R4, A1, H1, H2, S1, H5, H3 and H4' which involves selecting the cells containing 22, 57, 92, 23, 11, 42, 24, 00, 88, 09 and 02 from the secondary matrix.

The comparator means 18 compares the order in which the user selects the cells from the secondary matrix with the order in which the cells from the first matrix were selected. If the orders of selection are identical, then the authentication means 20 successfully authenticates the user. In order to make the aforementioned process hack resistant and secured, the primary matrix containing alphanumeric characters could be offered to the user on the GPRS mobile phone associated with the user, and subsequently the secondary matrix containing numerical can be offered to the user on his/her personal computer. The user can provide the order of selection of cells of the primary matrix, through his/her GPRS enabled mobile phone. The user can subsequently choose the order of selection of cells corresponding to the secondary matrix using either the mobile phone or the personal computer, thereby making the process of authentication hack resistant. It is highly unlikely that a hacker will be able to simultaneously hack onto the user's mobile phone as well as the personal computer.

In accordance with another exemplary embodiment of the present disclosure, there is provided an additional single transaction authentication mechanism based on the one time equation offered as a challenge by the challenge generation means 16. The one-time equation is transmitted by the challenge generation means to either the GPRS enabled mobile phone or the personal computer associated with the user. The registration means 14 is further adapted to prompt the user to provide a set of number-based personal details. The personal numbers provided by the user as well as the questions/prompts associated with each of the numbers are stored in the repository as a part of the profile information. Typically, these details may be date of birth of the user, mobile phone number of the user, some digits of the credit card number of the user, flat number of the user, car number of the user, bank account number of the user and the like. The repository may thus, include a date of birth as Sep. 9, 2009 and store a corresponding question which may read as, "Please use your date of birth as the variable in the equation?" or the repository, may, include a credit card third-last digit as '7' and a corresponding question which reads, "Please use third-last digit of your credit card number as the variable in the one-time equation." The one-time equation may be defined to include at least one variable in its Left Hand Side. The computing means 16B is utilized to calculate the answer to the equation, based on a number substituted for the variable of the equation, and store it in the storage means 16B for comparison and authentication purposes. When a prompt is presented to the user, asking the user to use a number as a variable, and solve the one-time equation, the user will need to remember the particular number which will fit the prompt and the associated variable, solve the equation, and key-in the answer. The comparator means 18 is compares the keyed-in answer with the answer calculated by the computing means 16A to accordingly authenticate the user.

Typically, the system 1000 includes a re-registration means (not shown in figures) adapted to be activated in case of a breach of security or fault. Amidst the activity of authentication as discussed above, if, in the event that a malicious attempt to hack the system occurs or multiple log-in failure attempts occur(s), the system 1000 is enabled to freeze/de-activate the user's corresponding account, and transactions thereby. Further, the re-registration means is engaged, wherein, alerts of such breach, and such freezing/de-activating of user's account are relayed to multiple pre-selected instruments (such as a phone, e-mail account, landline or the like). A multiple alternative relay ensures that at least one alert is safely delivered to the authentic user. The user may then proceed to re-activate his/her account through an ATM kiosk, which becomes a secure connection between the user and the bank/bank server, in case of banking transactions. Alternatively, with proper authorization client can perform repeat registration processes from their personal computers.

In accordance with another exemplary embodiment of the present disclosure, the system 1000 provides an additional layer of security to the process of authentication. The system 1000 includes a non-English database (not shown in figures) containing a plurality of non-English words. At least one out of these words from the database will be reflected as a CAPTCHA image on the display screen of the GPRS mobile phone or the personal computer associated with the user. Further, the user is prompted to key-in the correct English translation of the displayed CAPTCHA image. A secondary database (no shown in figures) with the correct English options corresponding the non-English database is also provided. Upon comparing, the non-English database, with the keyed input and the corresponding English database, a match may be recognized to approve authentication, or a mismatch may disapprove authentication.

Figure 2:
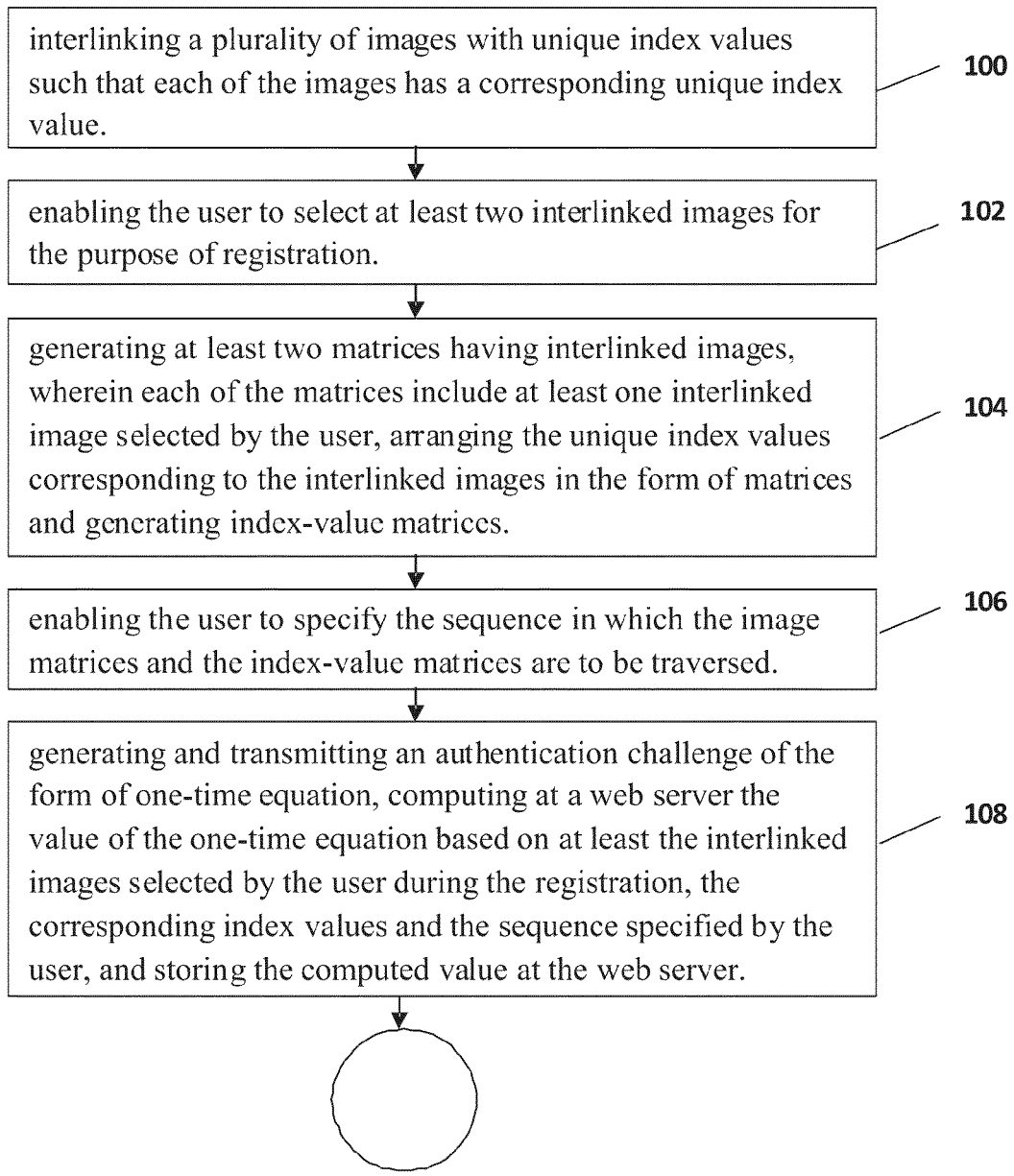
FIGS. 2 and 2A illustrates a flowchart corresponding to a computer implemented method for providing challenge-response solutions for authenticating a user, in accordance with the present disclosure.
Figure 2A:
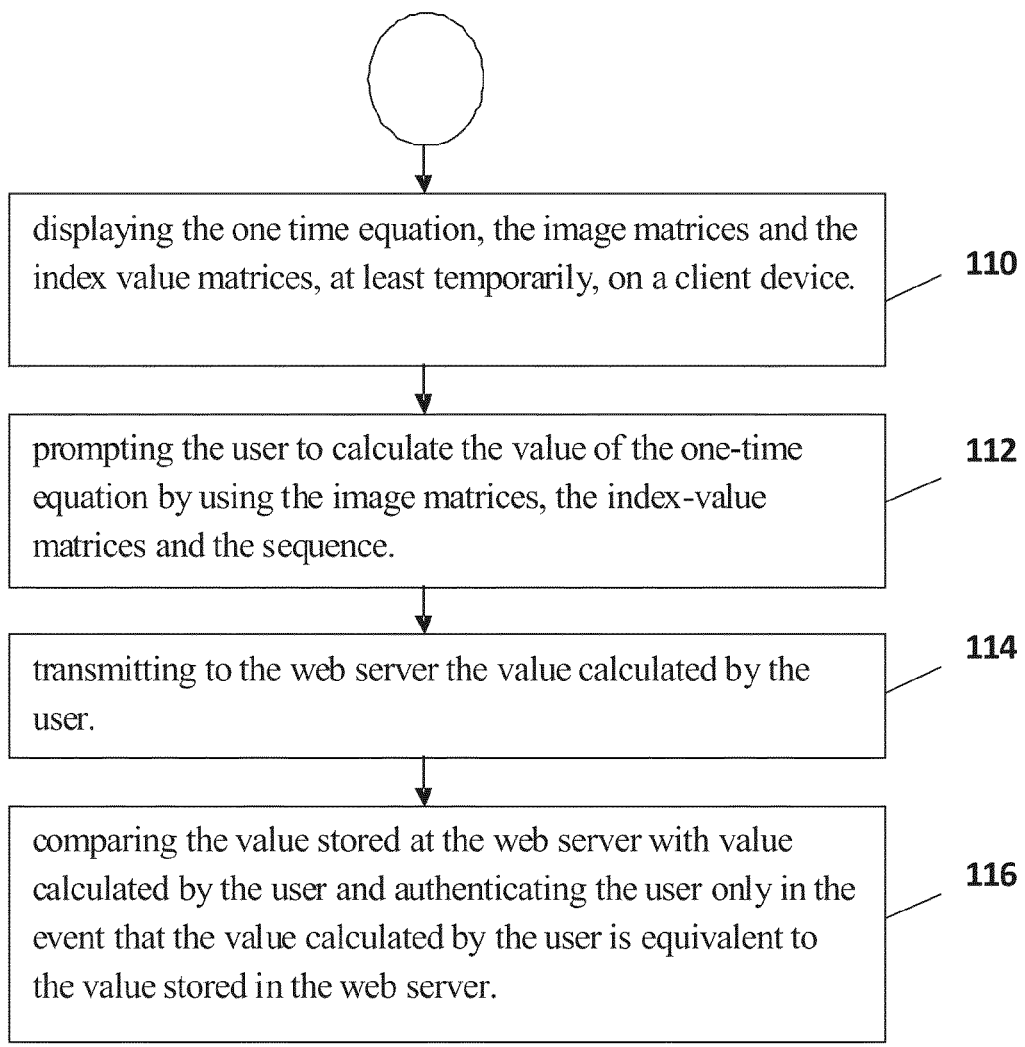

Referring to FIGS. 2 and 2A there is shown a flow chart corresponding to the computer implemented method for providing challenge-response solutions to authenticate a user. The method in accordance with the present disclosure includes the following steps:

- interlinking a plurality of images with unique index values such that each of said images has a corresponding unique index value (100);
- enabling said user to select at least two interlinked images for the purpose of registration (102);
- generating at least two image matrices having interlinked images, wherein each of the image matrices include at least one interlinked image selected by the user, arranging the unique index values corresponding to the interlinked images in the form of matrices and generating index-value matrices (104);
- enabling the user to specify the sequence in which the image matrices and the index-value matrices are to be traversed (106);
- generating and transmitting an authentication challenge of the form of one-time equation, computing at a web server the value of the one-time equation based on at least the interlinked images selected by the user during the registration, the corresponding index values and the sequence specified by the user, and storing the computed value at the web server (108);
- displaying the one time equation, the image matrices and the index value matrices, at least temporarily, on a client device (110);
- prompting the user to calculate the value of the one-time equation by using the image matrices, the index-value matrices and the sequence (112);
- transmitting to the web server the value calculated by the user (114); and
- comparing the value stored at the web server with value calculated by the user and authenticating the user only in the event that the value calculated by the user is equivalent to the value stored in the web server (116).

Typically, in accordance with the present disclosure, the method further includes the following steps:

- optionally arranging a set of alphanumeric characters and a set of images derived out of dot matrix combinations in the form of 5×7 matrices respectively;
- optionally enabling the user to select at least one of the set of alphanumeric characters and the set of images derived out of dot matrix combinations for the purpose of registration,
- prompting the user to select for the purpose of registration at least one of a plurality of alphanumeric characters from the set of alphanumeric characters and a plurality of images from the set of images derived out of dot matrix combinations;
- tracking the order in which at least one of a plurality of alphanumeric characters from the set of alphanumeric characters and a plurality of images from the set of images derived out of dot matrix combinations are selected by the user during the registration;
- storing the order in which the user selects at least one of a plurality of alphanumeric characters from the set of alphanumeric characters and a plurality of images from the set of images derived out of dot matrix combinations;
- generating and transmitting an authentication challenge of the form of a secondary matrix having entries selected form the group of entries consisting of numerals, alphabets and the images derived out of dot matrix combinations;
- instructing the user to select the entries of the secondary matrix in the same order as that in which at least one of the plurality of alpha numeric characters and the plurality of images were selected during the registration;

comparing the order in which the user selects the entries in the secondary matrix, with the order in at least one of the plurality of alpha numeric characters and the plurality of images were selected during the registration; and authenticating the user if the order in which the user selects the entries in the secondary matrix is same as the order in which at least one of the plurality of alpha numeric characters and the plurality of images were selected from the 5×7 matrix during the registration.

Typically, in accordance with the present disclosure, the method further includes the following steps:

optionally presenting said user with a plurality of questions/prompts;

enabling said user to input a plurality of personal details in the form of numbers as answers for said questions/prompts;

storing said numbers along with the corresponding questions/prompts.

generating a one-time equation and selecting at least one number and the corresponding question/prompt from the repository;

instructing said computing means to calculate the value of said one-time equation based on said number and further instructing said storage means to store said value;

presenting said one time equation and selected question/prompt to the user;

prompting said user to calculate value of said one-time equation by using the number which serves as the answer for the question/prompt; and comparing the value stored in the storage means with the value calculated by said user and authenticating said user in the event that stored value is equivalent to the value calculated by the user.

In accordance with another embodiment of the present disclosure, there is provided a computer program for instructing a computer to perform the method of providing challenge-response solutions to authenticate a user. The computer program, in accordance with the present disclosure is configured to:

interlink a plurality of images with unique index values such that each of the plurality of images has a corresponding unique index value;

enable a user to select at least two interlinked images for the purpose of registration;

generate at least two image matrices having interlinked images, wherein each of the image matrices include at least one interlinked image selected by the user, and arrange the unique index values corresponding to the interlinked images in the form of matrices and generating index-value matrices;

enable the user to specify the sequence in which the image matrices and the index-value matrices are to be traversed;

generate and transmit an authentication challenge of the form of one-time equation;

compute the value of the one-time equation based on at least the interlinked images selected by the user during the registration, the corresponding index values and the sequence specified by the user, and store the computed value at the web server;

display the one time equation, the image matrices and the index value matrices, at least temporarily, on a client device;

prompt the user to calculate the value of the one-time equation by using the image matrices, the index-value matrices and the sequence;

transmit to the web server the value calculated by the user; and compare the value stored at the web server with value calculated by the user and authenticate the user only in the event that the value calculated by the user is equivalent to the value stored in the web server.

Typically, in accordance with the present disclosure, the computer program is further configured to:

optionally arrange a set of alphanumeric characters and a set of images derived out of dot matrix combinations in the form of 5×7 matrices respectively;

optionally enable the user to select at least one of the set of alphanumeric characters and the set of images derived out of dot matrix combinations for the purpose of registration;

prompt the user to select for the purpose of registration, at least one of a plurality of alphanumeric characters from the set of alphanumeric characters and a plurality of images from the set of images derived out of dot matrix combinations;

track the order in which at least one of a plurality of alphanumeric characters from the set of alphanumeric characters and a plurality of images from the set of images derived out of dot matrix combinations are selected by the user during the registration;

store the order in which the user selects at least one of a plurality of alphanumeric characters from the set of alphanumeric characters and a plurality of images from the set of images derived out of dot matrix combinations;

generate and transmit an authentication challenge of the form of a secondary matrix having entries selected form the group of entries consisting of numerals, alphabets and the images derived out of dot matrix combinations;

instruct the user to select the entries of the secondary matrix in the same order as that in which at least one of the plurality of alpha numeric characters and the plurality of images were selected during the registration;

compare the order in which the user selects the entries in the secondary matrix, with the order in at least one of the plurality of alpha numeric characters and the plurality of images were selected during the registration; and authenticate the user if the order in which the user selects the entries in the secondary matrix is same as the order in which at least one of the plurality of alpha numeric characters and the plurality of images were selected from the 5×7 matrix during the registration.

Typically, in accordance with the present disclosure, the computer program is further configured to:

optionally present the user with a plurality of questions/prompts;

enable the user to input a plurality of personal details in the form of numbers as answers for the questions/prompts;

store the numbers along with the corresponding questions/prompts;

generate a one-time equation and select at least one number and the corresponding question/prompt from the repository;

instruct the computing means to calculate the value of the one-time equation based on the number and further instruct the storage means to store the value;

present the one time equation and selected question/prompt to the user;

prompt the user to calculate value of the one-time equation by using the number which serves as the answer for the question/prompt; and compare the value stored in the storage means with the value calculated by the user and authenticate the user in the event that stored value is equivalent to the value calculated by the user.

TECHNICAL ADVANTAGES

The technical advantages of the system and method of the present disclosure include:

providing a combination of authentication mechanisms to duly authenticate a user;

providing a system that allows for images/pictures to be used as pass codes for authenticating a user;

providing a system that enables users to create their own customized picture identifiers for the purpose of authentication;

providing a system that makes use of a combination of picture identifiers and session based one-time equations for authenticating a user;

providing a system that facilitates authenticating the clients using personal computers as well as mobile phones;

providing a system that prevents spoofing/cloning and 'man in the middle' attacks;

providing a system that makes available multiple authentication options for users; and providing a system that is secured and hack resistant.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the particular features of this invention, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation

The invention claimed is:

1. A computer implemented system for providing challenge-response solutions to authenticate a user, said system comprising:

a web server configured to:

interlink a plurality of images with unique index values such that each of said images has a corresponding unique index value;

enable said user to select at least two interlinked images for the purpose of registration;

generate at least two image matrices having interlinked images, wherein each of said image matrices include at least one interlinked image selected by said user, arrange the unique index values corresponding to said interlinked images in the form of matrices and generate index-value matrices, and transmit said image matrices and index-value matrices; and enable said user to specify the sequence in which said image matrices and said index-value matrices are to be traversed, said sequence selected from the group of sequences consisting of clockwise sequence, anti-clockwise sequence, clockwise Z sequence, and anti-clockwise Z sequence;

generate and transmit an authentication challenge in the form of a one-time equation;

compute the value of said one-time equation based on the sequence specified by said user, the interlinked images selected by the user during registration, and the corresponding unique index-values;

store the value of said one-time equation in a memory;

prompt said user to calculate a value of said one-time equation by using said image matrices, said index-value matrices, and said sequence;

receive the value calculated by said user;

compare the value stored in said memory with the value calculated by said user; and authenticate said user in the event that the value calculated by said user is equivalent to the value stored in said memory.

2. The system as claimed in claim 1, wherein said web server cooperates with a client device, said client device configured to:

receive and display at least one of said one-time equation, said image matrices, and said index value matrices, at least temporarily; and transmit to said web server the value calculated by said user.

3. The system as claimed in claim 1, wherein said web server is further configured to:

store in a repository at least one of profile information corresponding to said users, a set of alphanumeric characters, a set of images derived out of dot matrix combinations, a plurality of numbers, and questions to which said numbers serve as answers, wherein the plurality of images and the unique index values correspond to said images.

4. The system as claimed in claim 3, wherein said web server is further configured to:

enable said user to select for the purpose of registration at least one of a plurality of alphanumeric characters from said set of alphanumeric characters and a plurality of images from said set of images derived out of dot matrix combinations, wherein said set of alphanumeric characters and said set of images are arranged in the form of respective 5×7 dot matrices;

track the order in which at least one of said plurality of alphanumeric characters and said plurality of images are selected by said user; and store the order in which said user selects at least one of said plurality of alphanumeric characters and said plurality of images in said repository.

5. The system as claimed in claim 4, wherein said web server is further configured to:

generate and transmit an authentication challenge in the form of a secondary matrix only in the event that said user selects at least one of said set of alphanumeric characters and said set of images derived out of dot matrix combinations for the purpose of registration, wherein said secondary matrix includes entries selected from the group of entries consisting of numerals, alphabets, and said set of images derived out of dot matrix combinations; and instruct said user to select the entries of said secondary matrix in the same order as that in which at least one of said plurality of alphanumeric characters and said plurality of images were selected from said 5×7 dot matrices during registration.

6. The system as claimed in claim 5, wherein said web server is further configured to compare the order in which said user selects the entries from said secondary matrix with the order in which at least one of said plurality of alphanumeric characters and said plurality of images were selected from said 5×7 dot matrices during registration.

7. The system as claimed in claim 6, wherein said web server is further configured to authenticate said user only in the event that the order in which said user selects the entries from said secondary matrix is the same as the order in which at least one of said plurality of alphanumeric characters and said plurality of images were selected from said 5×7 dot matrices during registration.

8. The system as claimed in claim 1, wherein said web server is further configured to:
present said user with a plurality of questions;
enable said user to input a plurality of personal details in the form of numbers as answers to said questions; and
store said numbers along with the corresponding questions in a repository.

9. The system as claimed in claim 8, wherein said web server is further configured to:
generate a second one-time equation and select at least one number and the corresponding question from said repository;
compute the value of said second one-time equation based on said number;
store the computed value in said memory;
present said second one-time equation and said selected question to said user;
prompt said user to calculate the value of said second one-time equation by using the number which serves as the answer to the question;
receive the value calculated by said user;
compare the value stored in said memory with the value calculated by said user; and
authenticate said user in the event that the stored value is equivalent to the value calculated by said user.

10. A computer implemented method for providing challenge-response solutions to authenticate a user, said method including the following steps:
interlinking a plurality of images with unique index values such that each of said images has a corresponding unique index value;
enabling said user to select at least two interlinked images for the purpose of registration;
generating at least two image matrices having interlinked images, wherein each of said image matrices include at least one interlinked image selected by said user;
arranging said unique index values corresponding to said interlinked images in the form of matrices and generating index-value matrices;
enabling said user to specify a sequence in which said image matrices and said index-value matrices are to be traversed;
generating and transmitting an authentication challenge in the form of a one-time equation;
computing at a web server the value of said one-time equation based on at least said interlinked images selected by said user during registration, said corresponding index values, and said sequence specified by said user, and storing the computed value at said web server;
displaying said one-time equation, said image matrices, and said index value matrices, at least temporarily, on a client device;
prompting said user to calculate the value of said one-time equation by using said image matrices, said index-value matrices, and said sequence;
receiving at said web server the value calculated by said user; and
comparing the value stored at said web server with the value calculated by said user; and
authenticating said user only in the event that the value calculated by said user is equivalent to the value stored at said web server.

11. The computer implemented method as claimed in claim 10, wherein the method further includes the following steps:
arranging a set of alphanumeric characters and a set of images derived out of dot matrix combinations in the form of 5×7 dot matrices, respectively;
enabling said user to select at least one of said set of alphanumeric characters and said set of images derived out of dot matrix combinations for the purpose of registration;
prompting said user to select for the purpose of registration at least one of a plurality of alphanumeric characters from said set of alphanumeric characters and a plurality of images from said set of images derived out of dot matrix combinations;
tracking the order in which at least one of said plurality of alphanumeric characters from said set of alphanumeric characters and said plurality of images from said set of images derived out of dot matrix combinations are selected by said user during registration;
storing the order in which said user selects at least one of said plurality of alphanumeric characters from said set of alphanumeric characters and said plurality of images from said set of images derived out of dot matrix combinations;
generating and transmitting an authentication challenge in the form of a secondary matrix having entries selected from the group of entries consisting of numerals, alphabets, and said set of images derived out of dot matrix combinations;
instructing said user to select the entries of said secondary matrix in the same order as that in which at least one of said plurality of alphanumeric characters and said plurality of images were selected during registration;
comparing the order in which said user selects the entries in the secondary matrix with the order in which at least one of said plurality of alphanumeric characters and said plurality of images were selected during registration; and
authenticating said user if the order in which said user selects the entries from said secondary matrix is same as the order in which at least one of said plurality of alphanumeric characters and said plurality of images were selected from said 5×7 dot matrices during registration.

12. The computer implemented method as claimed in claim 10, wherein the method further includes the following steps:
presenting said user with a plurality of questions;
enabling said user to input a plurality of personal details in the form of numbers as answers to said questions;

storing said numbers along with the corresponding questions in a repository;

generating a second one-time equation and selecting at least one number and the corresponding question from said repository;

computing at said web server the value of said second one-time equation based on said number;

storing the computed value at said web server;

presenting said second one-time equation and said selected question to said user;

prompting said user to calculate the value of said second one-time equation by using the number which serves as the answer to the question;

receiving at said web server the value calculated by said user;

comparing the value stored at said web server with the value calculated by said user; and authenticating said user in the event that the stored value is equivalent to the value calculated by said user.

13. A non-transitory computer-readable medium including a computer program for instructing a computer to perform the method of providing challenge-response solutions to authenticate a user, said computer program configured to:

interlink a plurality of images with unique index values such that each of said plurality of images has a corresponding unique index value;

enable said user to select at least two interlinked images for the purpose of registration;

generate at least two image matrices having interlinked images, wherein each of said image matrices include at least one interlinked image selected by said user;

arrange said unique index values corresponding to said interlinked images in the form of matrices and generating index-value matrices;

enable said user to specify a sequence in which said image matrices and said index-value matrices are to be traversed;

generate and transmit an authentication challenge in the form of a one-time equation;

compute the value of said one-time equation based on at least said interlinked images selected by said user during registration, said corresponding index values, and said sequence specified by said user, and store the computed value at said web server;

display said one-time equation, said image matrices, and said index value matrices, at least temporarily, on a client device;

prompt said user to calculate the value of said one-time equation by using said image matrices, said index-value matrices, and said sequence;

receive at said web server the value calculated by said user; and compare the value stored at said web server with the value calculated by said user; and authenticate said user only in the event that the value calculated by said user is equivalent to the value stored at said web server.

14. The non-transitory computer-readable medium including a computer program as claimed in claim 13, wherein said computer program is further configured to:

arrange a set of alphanumeric characters and a set of images derived out of dot matrix combinations in the form of 5×7 dot matrices, respectively;

enable said user to select at least one of said set of alphanumeric characters and said set of images derived out of dot matrix combinations for the purpose of registration;

prompt said user to select for the purpose of registration at least one of a plurality of alphanumeric characters from said set of alphanumeric characters and a plurality of images from said set of images derived out of dot matrix combinations;

track the order in which at least one of said plurality of alphanumeric characters from said set of alphanumeric characters and said plurality of images from said set of images derived out of dot matrix combinations are selected by said user during registration;

store the order in which said user selects at least one of said plurality of alphanumeric characters from said set of alphanumeric characters and said plurality of images from said set of images derived out of dot matrix combinations;

generate and transmit an authentication challenge in the form of a secondary matrix having entries selected from the group of entries consisting of numerals, alphabets, and said set of images derived out of dot matrix combinations;

instruct said user to select the entries of said secondary matrix in the same order as that in which at least one of said plurality of alphanumeric characters and said plurality of images were selected during registration;

compare the order in which said user selects the entries in the secondary matrix with the order in which at least one of said plurality of alphanumeric characters and said plurality of images were selected during registration; and authenticate said user if the order in which said user selects the entries from said secondary matrix is same as the order in which at least one of said plurality of alphanumeric characters and said plurality of images were selected from said 5×7 dot matrices during registration.

15. The non-transitory computer-readable medium including a computer program as claimed in claim 13, wherein said computer program is further configured to:

present said user with a plurality of questions;

enable said user to input a plurality of personal details in the form of numbers as answers to said questions;

store said numbers along with the corresponding questions in a repository;

generate a second one-time equation and select at least one number and the corresponding question from said repository;

compute at said web server the value of said second one-time equation based on said number;

store the computed value at said web server;

present said second one-time equation and said selected question to said user;

prompt said user to calculate the value of said second one-time equation by using the number which serves as the answer to the question;

receive at said web server the value calculated by said user;

compare the value stored at said web server with the value calculated by said user; and authenticate said user in the event that the stored value is equivalent to the value calculated by said user.

* * * * *